United States Patent [19]

Goff et al.

[11] Patent Number: 4,792,737
[45] Date of Patent: Dec. 20, 1988

[54] CIRCUIT FOR CONTROLLING THE MOTION OF A MOVING OBJECT

[75] Inventors: Kenneth W. Goff; Gary E. Chizever, both of Abington, Pa.

[73] Assignee: Performance Controls, Inc., Horsham, Pa.

[21] Appl. No.: 62,189

[22] Filed: Jun. 15, 1987

[51] Int. Cl.$^4$ .............................................. G05B 5/01
[52] U.S. Cl. .................... 318/615; 318/560; 318/616; 360/74.2
[58] Field of Search ........ 318/619, 629, 611, 615–618, 318/561, 560, 628, 327, 632; 360/71, 74.2

[56] References Cited

U.S. PATENT DOCUMENTS

| | | | |
|---|---|---|---|
| 3,870,939 | 3/1975 | Robert | 318/611 |
| 4,025,839 | 5/1977 | Maury | 318/632 |
| 4,139,811 | 2/1979 | Klinger | 318/615 |
| 4,215,298 | 7/1980 | Bigley | 318/327 |
| 4,280,083 | 8/1981 | Hirai et al. | 318/616 |
| 4,331,910 | 5/1982 | Kohzai | 318/618 |
| 4,341,986 | 7/1982 | Browder | 318/618 |
| 4,345,194 | 8/1982 | Green | 318/621 |
| 4,475,073 | 10/1984 | Hawkins | 318/618 |
| 4,498,036 | 2/1985 | Salemka | 318/561 |
| 4,507,592 | 3/1985 | Anderson | 318/618 |
| 4,535,277 | 8/1985 | Kurakake | 318/561 |
| 4,540,923 | 9/1985 | Kade | 318/561 |
| 4,638,230 | 1/1987 | Lee | 318/616 |
| 4,691,152 | 9/1987 | Ell et al. | 318/616 |

OTHER PUBLICATIONS

Velocity Decoding in Digital Control Systems, by Jacob Tal (Proc. 9th Symp. Inc. Mot. Cont. Sys. 1980)

Computer Controlled Systems, Chapter 11, by Karl Astrom et al. (Prentice-Hall)

Primary Examiner—William M. Shoop, Jr.
Assistant Examiner—Brian Young
Attorney, Agent, or Firm—William H. Eilberg

[57] ABSTRACT

A circuit is disclosed for controlling the position or velocity of a moving object. The motion of the object may be linear or rotational. The object is moved by an electric motor, or linear actuator, which is driven by a power amplifier. The current output of the amplifier, which drives the motor or linear actuator, is controlled by an input signal based at least in part on the estimated velocity of the object. The control circuit includes a pair of integrators connected in series, the inputs to the integrators being dependent both on the current output from the amplifier, and on the difference between the output of the second integrator and the actual sensed position of the object. The velocity estimation circuit is thus based on a form of Kalman filter. The velocity estimator uses a model of the motor which is extremely simple, and which contains only constants. The velocity estimator can control the motor very accurately without detailed knowledge of the model of the motor. The present invention replaces relatively expensive device, such as tachometers, with comparatively inexpensive electronic circuity. The invention also includes a method and apparatus which enable the device to calculate automatically the constants needed for efficient operation. The device therefore has the advantage that it can calibrate itself. The circuit can be implemented in either analog or digital form.

30 Claims, 7 Drawing Sheets

CIRCUIT FOR CONTROLLING THE MOTION OF A MOVING OBJECT

BACKGROUND OF THE INVENTION

This invention relates to the field of motion control, and deals with servomechanisms which accurately control the position or velocity of a moving object. The invention can be used to control objects whose motion is either linear or rotational.

In various industrial processes, it is necessary to control the linear or angular motion of an object. For example, a motor may be used to control the position of a robot in a factory. Such control is accomplished by controlling precisely the angular position of a rotating shaft.

In another example, in tuning a magnetron, it is necessary to adjust remotely and precisely the position of a wall of a resonant cavity. A controlled linear motor can be used for this purpose.

In the prior art, it has been known to control the angular position of a rotating shaft of a motor, by providing position and velocity feedback. Velocity feedback is obtained by continuously monitoring the angular position of the shaft, and converting this information into data on its angular velocity. A signal representing the estimated angular velocity is fed back to the input side of the power amplifier which drives the motor.

The simplest and most obvious way to obtain an estimate of velocity is to differentiate the position signal. This procedure has been done, and it works reasonably well. However, electronic differentiation is an inherently noisy process, especially when the object is moving very slowly. Even where the object has been successfully brought to its new desired position, the "noise" generated by the differentiation circuit produces extraneous current in the motor windings, resulting in unwanted heating. It also may cause spurious motions in the object itself.

Another method of estimating the angular velocity is to connect a tachometer to the object. This technique is often used to estimate the angular velocity of a rotating shaft. Examples of patents using such tachometers for velocity feedback include U.S. Pat. Nos. 4,341,986 and 4,345,194. A tachometer can reduce the noise associated with an ordinary differentiator, but it does significantly affect the cost and reliability of the apparatus, and adds to the cost of installation.

An all-electronic estimator of velocity has also been considered, in the prior art. The paper by Jacob Tal, entitled "Velocity Decoding in Digital Control Systems", of the Proceedings of the 9th Symposium on Incremental Motor Control Systems, 1980, discusses the possible use of a Kalman filter as part of a motor control circuit. However, the paper does not give details of the circuitry that would be used, and also states that the use of a Kalman filter is not practical unless a detailed model of the motor is available. The cited paper also suggests that this approach would require an unduly large amount of computation time.

The present invention provides a velocity estimation circuit which replaces the tachometer used in the prior art. The invention is completely electronic, and it can be implemented in either analog or digital form. The invention can thus reduce the cost of motor control circuitry by as much as about 15-20% of the cost of the motor and control units. Moreover, the device of the present invention operates by integration, not differentiation. The present invention therefore substantially reduces the electrical noise which is an inherent characteristic of differentiators.

SUMMARY OF THE INVENTION

The present invention comprises a circuit for providing an estimate of velocity, used in controlling a motor which moves an object. The velocity estimator circuit accepts two inputs from the apparatus being controlled. The first input is the current which drives the motor. The second input is the measured position of the object. The current signal is multiplied by one or more constants, the constants representing a very simple model of the motor. The product of these constants and the current signal represents the acceleration of the object.

The acceleration signal is integrated twice, electronically, to produce a signal representing estimated position. The estimated position signal is electronically compared with the actual position signal, and an error signal, equal to the difference between actual and estimated position, is fed back to the inputs of the integrators, after being multiplied by appropriate filter constants. The velocity estimator circuit is thus a member of the general class of circuits known as Kalman filters.

The estimated velocity may be taken as the voltage appearing at the input to the second integrator, or the output of the first integrator. The estimated velocity signal is then fed back to the input of the power amplifier which drives the motor, to control the motion of the object.

It is a significant feature of the invention that the structure of the motor, and the amplifier which drives the motor, can be modeled by constants. A detailed knowledge of the motor and the amplifier is not necessary. In general, the velocity estimating circuit can control the motor accurately, using knowledge of only the ratio of the torque constant to the moment of inertia of the motor and load, and of two constants internal to the estimator circuit.

As suggested above, it is necessary to know certain constants in order to practice the invention. In one embodiment of the invention, the constants are computed automatically. When the motor is turned on, the ratio of the torque constant and moment of inertia of the motor and load (or the ratio of the force constant to the mass, in the case of linear motion) is automatically determined by analysis of the movement of the motor.

It is therefore an object of the present invention to provide a method and apparatus for controlling the motion of an object.

It is another object of the invention to provide a substitute for conventional differentiating circuits and tachometers as means of obtaining velocity feedback in the field of motion control.

It is another object to provide a reliable, electronic means of control of a motor, either linear or rotational.

It is another object to provide an apparatus as described above, wherein the apparatus operates efficiently for a wide range of motor sizes, without adjustment.

It is another object to provide a velocity estimation circuit which can be implemented in either analog or digital form.

It is another object to increase the reliability, and decrease the cost, of conventional motor control devices.

It is another object to provide a motor control system which adjusts itself according to the characteristics of the motor being controlled.

Other objects and advantages of the invention will be apparent to those skilled in the art, from a reading of the following brief description of the drawings, the detailed description of the invention, and the appended claims.

DETAILED DESCRIPTION OF THE INVENTION

The present invention deals with motor control, either linear or rotational. In most cases, the primary feedback parameter is the position signal, but many servomechanisms also include velocity feedback for more accurate control. Also, the present invention could be used in contexts where it is necessary to control only the velocity, but not the position. In the latter case, the velocity feedback signal is the primary means of control.

In obtaining velocity feedback, it is therefore necessary to estimate the velocity of the object, and to feed this information back to the power amplifier which controls the motor.

While the description that follows often uses the terminology of rotational motion, it is understood that the invention can also be used to control linear motion.

Figure 1:
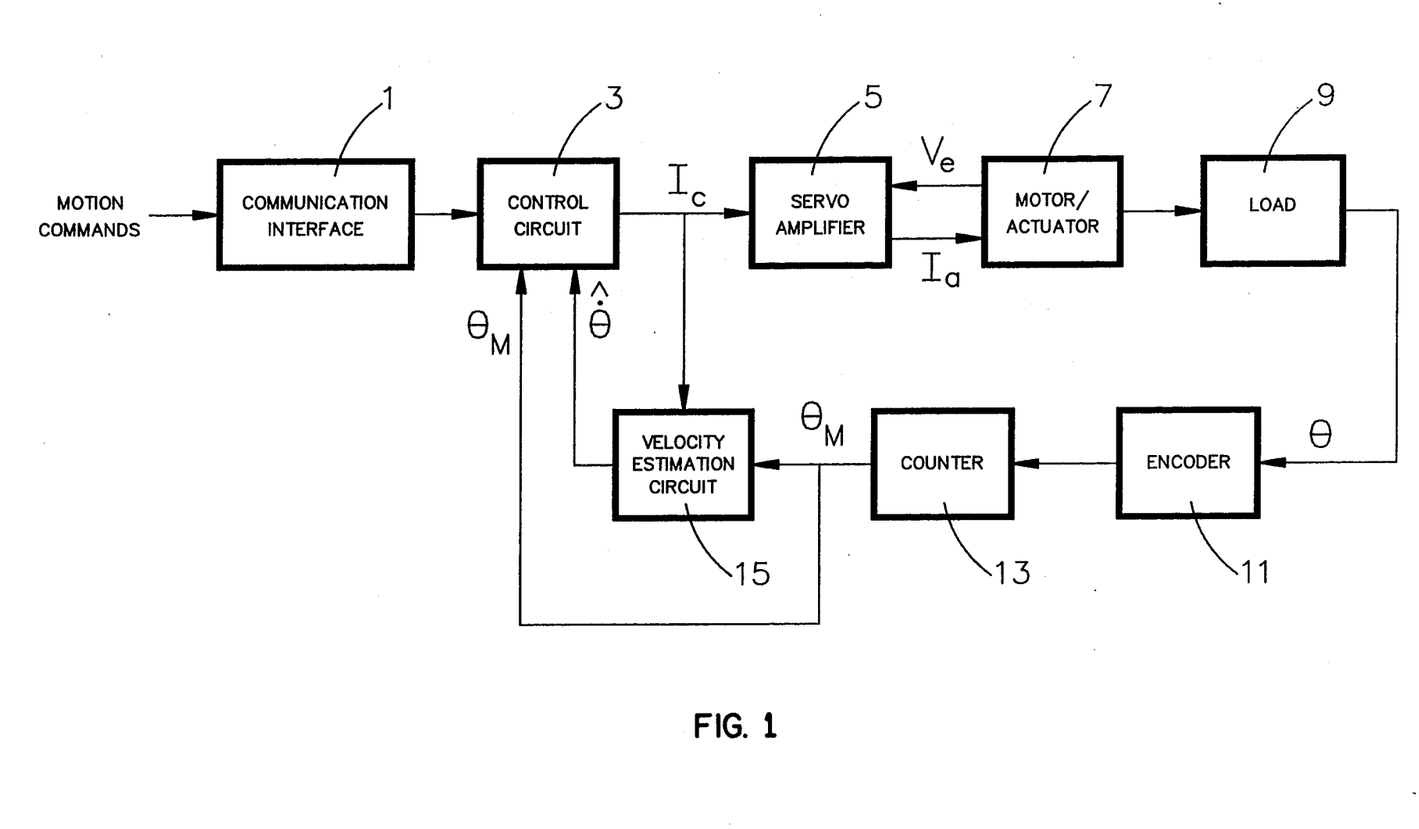
FIG. 1 is a block diagram of a motion control system which includes a velocity estimation circuit.

FIG. 1 is a block diagram showing a motion control system in which the circuit of the present invention can be used. Motion commands, orginated by a computer (not shown), or by another source external to the circuit, are converted, in communication interface 1, into suitable motion command signals. These command signals may include commands controlling the desired angular position, angular velocity, or angular acceleration, or any combination of these. The circuit of FIG. 1 shows both position and velocity feedback.

The signal from interface 1 is processed by another circuit, designated as control circuit 3, which accepts information about position and velocity and generates a current to be applied to the motor.

The current command generated by the control circuit is fed to servo amplifier 5, which controls motor or actuator 7. The motor drives load 9, which may be simply a shaft.

The true position $\theta$ of load 9 is sensed by encoder 11, which generates a series of pulses representing the motion of the load. The pulses are counted in counter 13. Velocity estimation circuit 15, which is the heart of the present invention, receives the measured position signal $\theta_M$ from the counter, and the current command $I_C$ applied to the servo amplifier, and generates an estimate $\dot{\theta}$ of velocity which is fed back to the motor control circuit.

Figure 2:
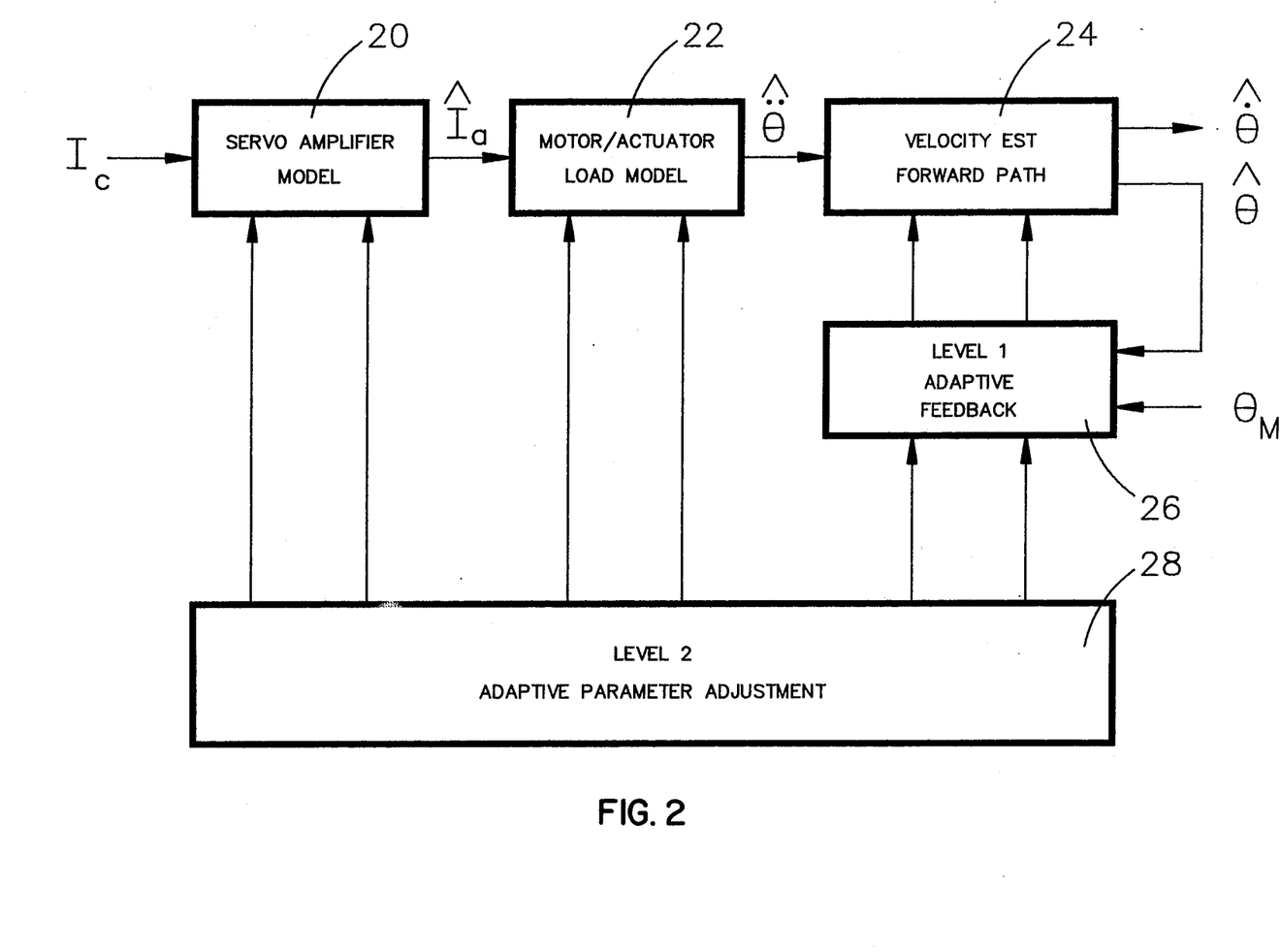
FIG. 2 is a block diagram of the major components of the velocity estimation circuit of the present invention.

FIG. 2 shows a block diagram of velocity estimation circuit 15 of FIG. 1. The control current $I_C$ is passed through circuits 20 and 22, representing models of the servo amplifier and the motor/actuator, respectively. The output of model 20 is estimated amplifier current $I_a$. In the simplest form of the invention, circuit 20 can be omitted, and circuit 22 can be a component which multiplies the current by a constant to produce an estimate $\ddot{\theta}$ of acceleration.

More specifically, in the case of rotational motion, we define the torque constant $K_T$ of the motor by $$T = K_T I,$$

where T is the motor torque, and I is the motor current. Then, since $$T = J(\ddot{\theta}),$$

where J is the moment of inertia of the motor and the load, and $\theta$ is the angular position, it follows that $$\ddot{\theta} = K_T I / J.$$

Thus, an estimate of the angular acceleration can be obtained by multiplying the motor current by $K_T/J$.

In the case of linear motion, the motor model would instead be $K_F/M$, where M is the mass of the motor and load, and $K_F$ is a force constant defined by $$F = K_F I,$$

F being the force generated by the motor.

Figure 3:
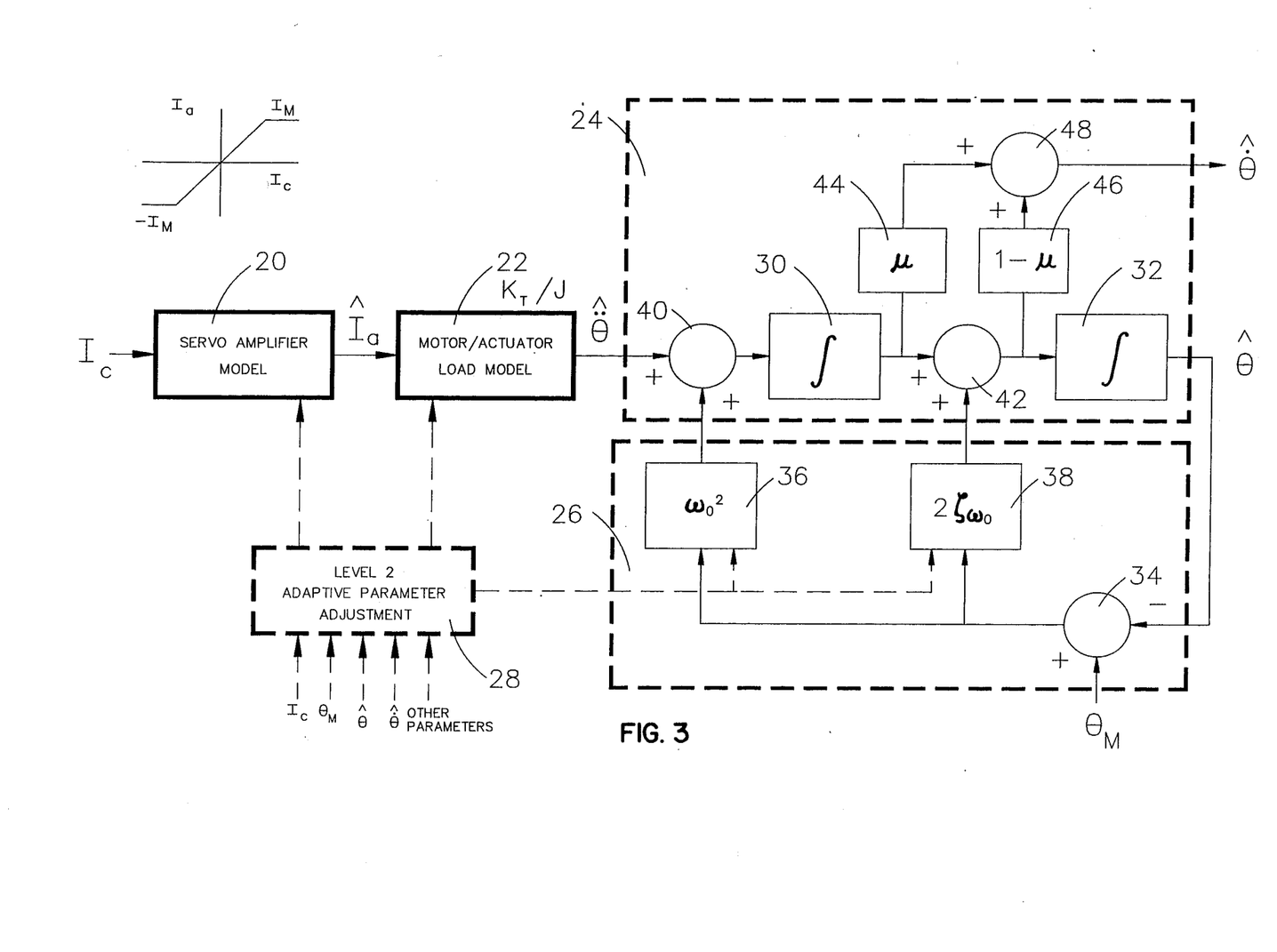
FIG. 3 is a block diagram showing more details of the velocity estimation circuit of the present invention.

One form of a simple model of the servo amplifier is depicted graphically above block 20, in FIG. 3. In this model, the amplifier output current $I_a$ varies linearly with the input current $I_c$, except that the output current does not exceed a certain predefined level $I_M$. This simple model more closely approximates the actual behavior of the servo amplifier.

The estimate of the angular or linear acceleration is fed into the "forward path" portion 24, of the velocity estimator circuit, as shown in FIG. 2. The forward path portion is essentially two integrators connected in series. Circuit 26, designated "Level 1 Adaptive Feedback", receives the integrated signal representing position, as well as the measured actual position of the object being controlled, and readjusts the parameters in circuit 24. Circuit 28, which is optional, is designated as the "Level 2 Adaptive Parameter Adjustment", and provides additional adjustments to the parameters of the circuit, as will be explained later.

FIG. 3 is a block diagram showing the details of the velocity estimation circuit of the present invention. Circuits 24, 26, and 28 are the same as shown in FIG. 2, and are enclosed within dotted lines. Blocks 20 and 22 are also intended to be the same as shown in FIG. 2.

As stated above, circuit 24 includes two integrators, 30 and 32, connected in series. The output of integrator 32, which represents an estimate of position, is fed to comparator 34, which produces a signal proportional to the difference between the estimated position $\theta$ and the measured position $\theta_M$. The signal from comparator 34 is multiplied by certain constants, described below, in blocks 36 and 38. The output of block 36 is added to the signal from block 22, in adder 40, the output of which is the input to integrator 30. The output of block 38 is added to the output of integrator 30, in adder 42, the output of which is connected to the input of integrator 32.

The estimated velocity can be taken from the output of integrator 30 or from the input to integrator 32, i.e. from either side of adder 42. If the output is taken from integrator 30, the signal has less noise. If the output is taken from the input to integrator 32, the result provides the fastest correction for errors, because the input to integrator 32 includes the feedback from block 38, and thus represents a more accurate velocity estimate. However, the signal at the input to integrator 32 is closer to a true derivative, so this signal is likely to have more noise than the output of integrator 30.

In general, the output velocity estimate is a linear combination of signals from the two points described above. Thus, the output of integrator 30 is multiplied by $\mu$, a constant between 0 and 1, in block 44, and the signal appearing at the input to integrator 32 is multiplied by $1-\mu$. The signals from blocks 44 and 46 are combined in adder 48 to provide the output signal. It is thus possible to achieve a compromise between smoothness of signal and speed of response, according to the choice of $\mu$.

The circuit represented in blocks 24 and 26 is thus an extension of the class of estimation circuits known as Kalman filters. The parameter $\omega_o$, appearing in blocks 36 and 38, is a constant which can be interpreted as the natural frequency of the filter.

In general, the frequency of the filter should be much greater than the speed at which the control loop responds to control current signals. Stated another way, the bandwidth of the filter should be large compared to the bandwidth of the control loop. If $\omega_o$ satisfies this criterion, the filter will adjust to changing conditions more rapidly than the servomechanism itself.

The parameter $\phi$, appearing in block 38, is an internal damping constant of the filter; it determines the smoothness with which the loop stabilizes itself. It is a dimensionless parameter whose value is not critical. A value of 0.7 provides a good level of damping. This is the value that would, in general, provide the best damping for any simple harmonic oscillator.

Circuit 28 can be made to respond to the motor current, the measured position, the estimated position and velocity, and other parameters. It can reflect the back emf generated by the motor, as it affects the motion of the object. It can also accommodate the friction in the motor. FIG. 3 indicates symbolically that this circuit also may adjust the filter parameters $\omega_o$ and $\phi$. A discussion of the ways by which this adjustment may be done is given below.

Figure 4:
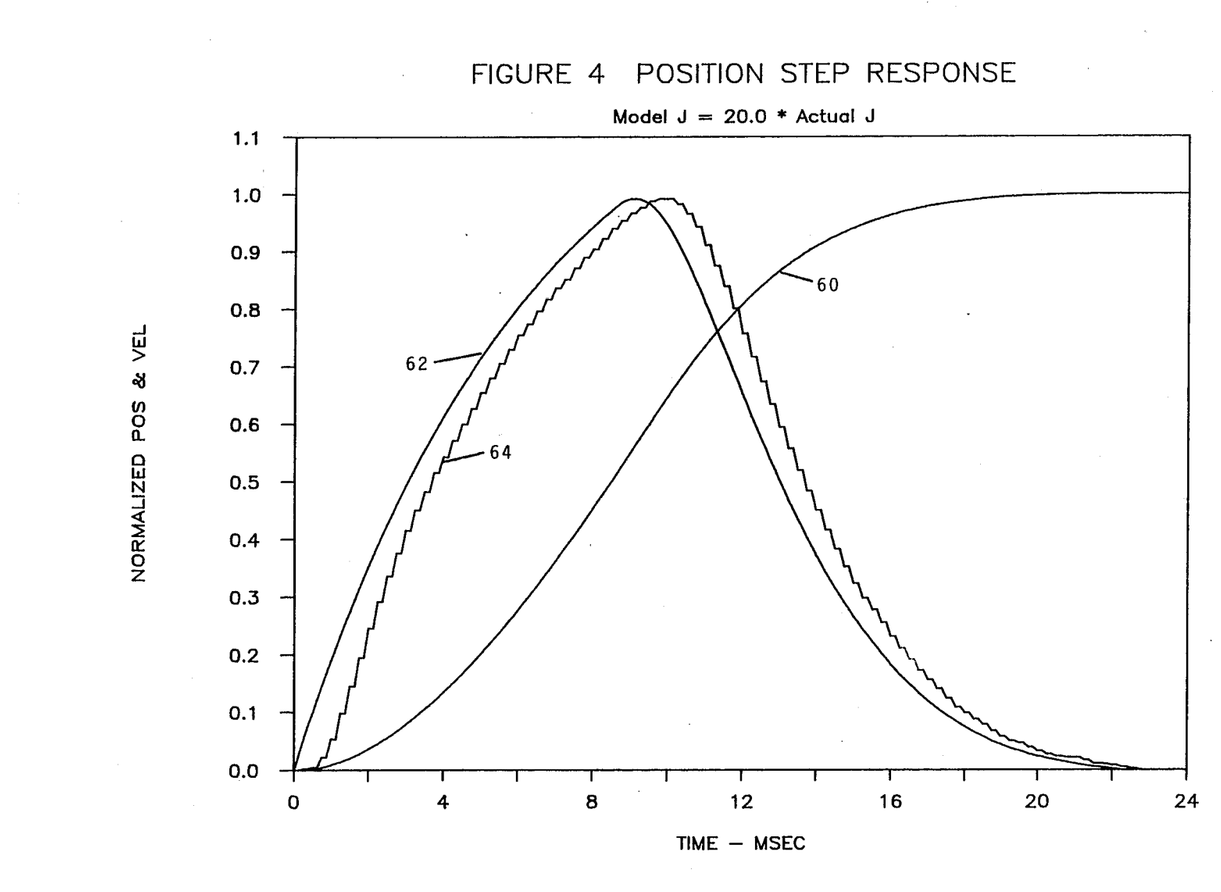
FIG. 4 shows graphs depicting the performance of the circuit of the present invention, when the value for the moment of inertia of the motor and load, in the mathematical model of the motor, is twenty times the true value.

FIGS. 4–7 are graphs showing the performance of the circuit of the present invention. Each of these figures plot position and velocity against time. In FIG. 4, curve 60 represents the angular position of the controlled object as it moves from an initial position to a position selected by the apparatus. Curve 62 represents the actual velocity of the object. Curve 64 represents the estimated velocity of the object, computed according to the circuit of the present invention, wherein the value of J, the moment of inertia, is 20 times the true value. Despite this deviation from the true value, curves 62 and 64 are remarkably close.

Note also that all the position curves of FIGS. 4–7 show that the circuit of the present invention accurately moves the object, from an initial position to the desired final position, with a minimal amount of overshoot. One can also show that, with the circuit of the present invention, there is very little noise in the motor circuit after the motor has "settled" into its final position. The noise level of the present circuit compares very favorably with the tachometer circuits of the prior art.

In FIGS. 4–7, the value of $K_T$ was 210 oz-in/amp. The true value of J was 0.25 oz-in-sec$^2$. The value of $\omega_o$ was 1800 rad/sec, and the value of $\phi$ was 0.7.

Figure 5:
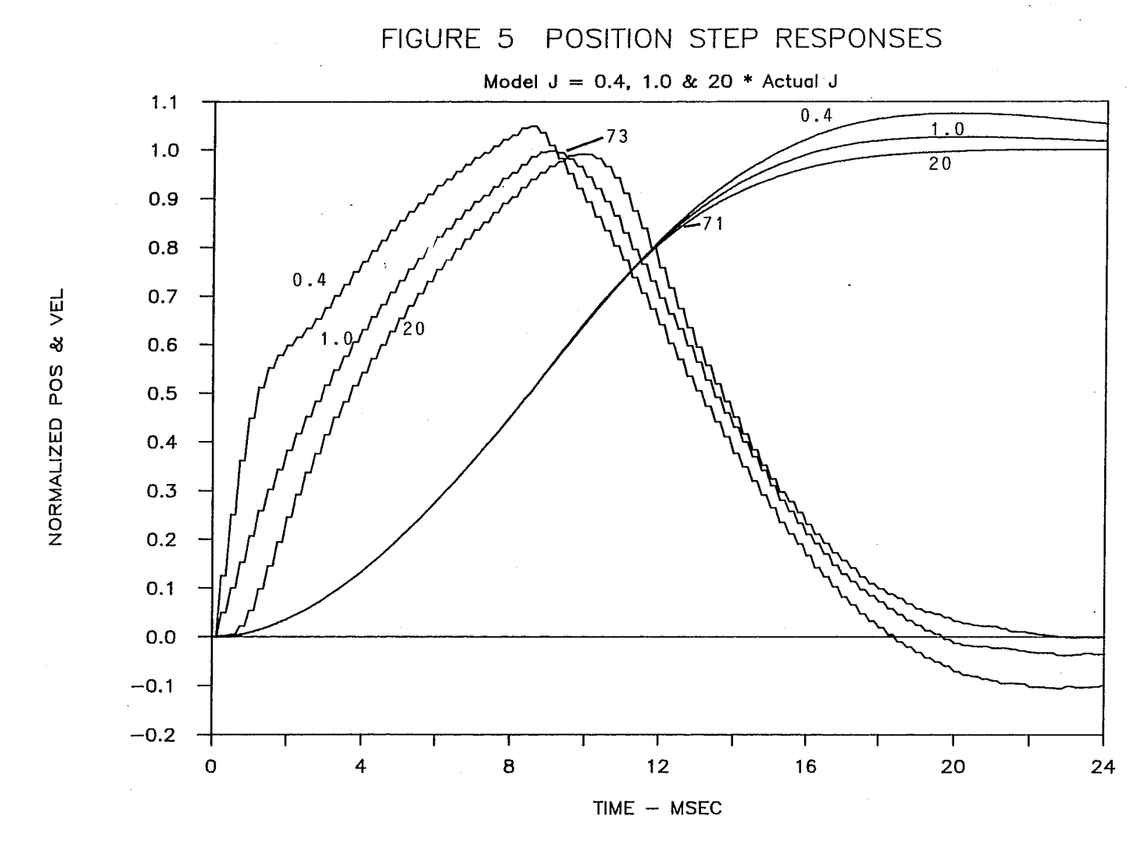
FIG. 5 is a set of graphs showing the performance of the circuit of the present invention, when the value for the moment of inertia of the motor, in the mathematical model of the motor, is 0.4, 1.0, and 20 times the true value.

In FIG. 5, the curves designated generally by reference numeral 71 represent the position of the object, for each of three tests, and the curves designated by 73 represent the corresponding values of estimated velocity. The three tests were taken for values of J equal to 0.4, 1.0, and 20 times the actual value of J. Despite the use of an inaccurate value of J, in the model of the motor, the results are quite close to those obtained when J is known accurately.

Figure 6:
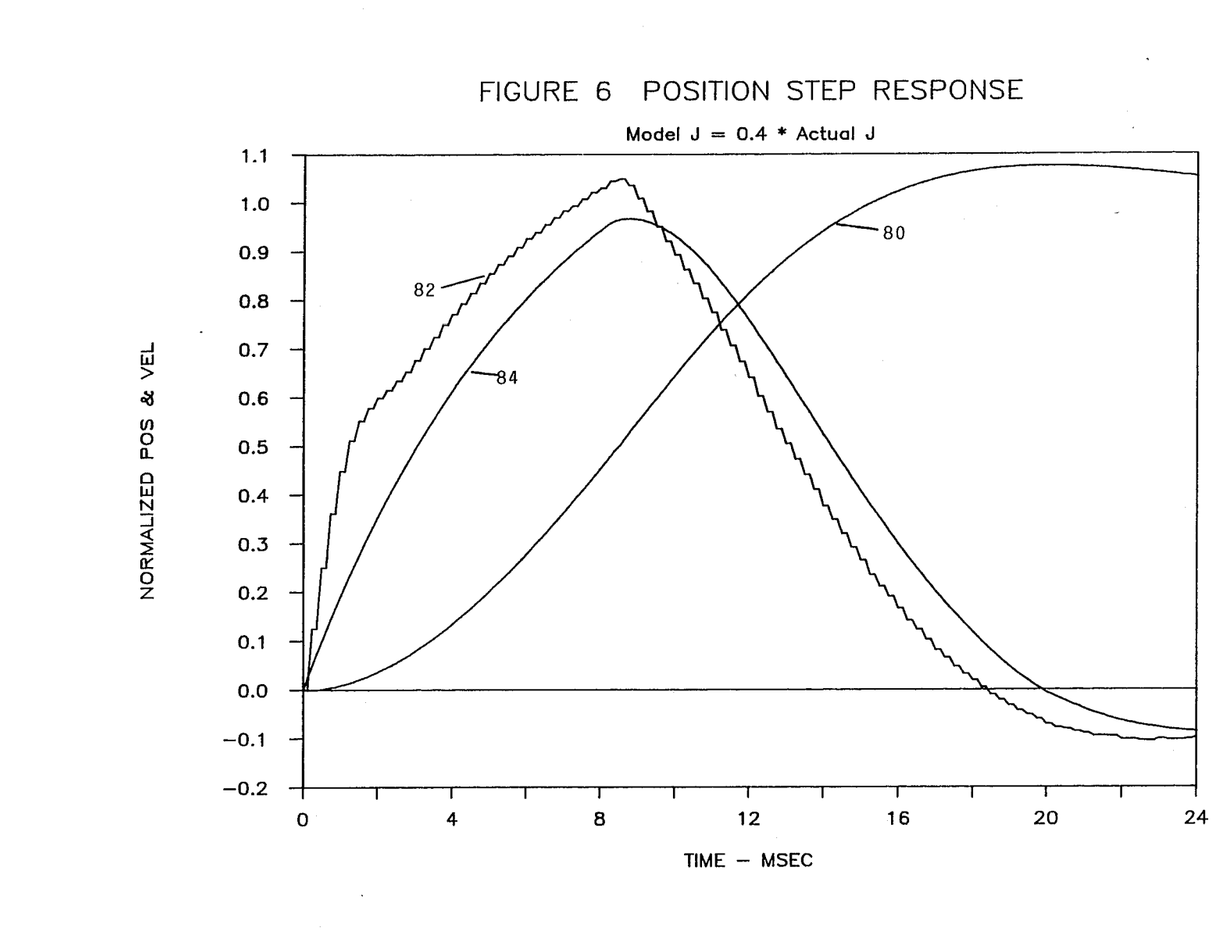
FIG. 6 shows graphs comparing the estimated velocity and the actual velocity of a motor controlled by the circuit of the present invention, when the value for the moment of inertia of the motor, in the mathematical model of the motor, is 0.4 times the true value.

FIG. 6 shows position curve 80 and velocity curves 82 and 84, when the value of J, in the model, is 0.4 times the true value. Curve 82 represents the estimated velocity and curve 84 is the actual velocity.

Figure 7:
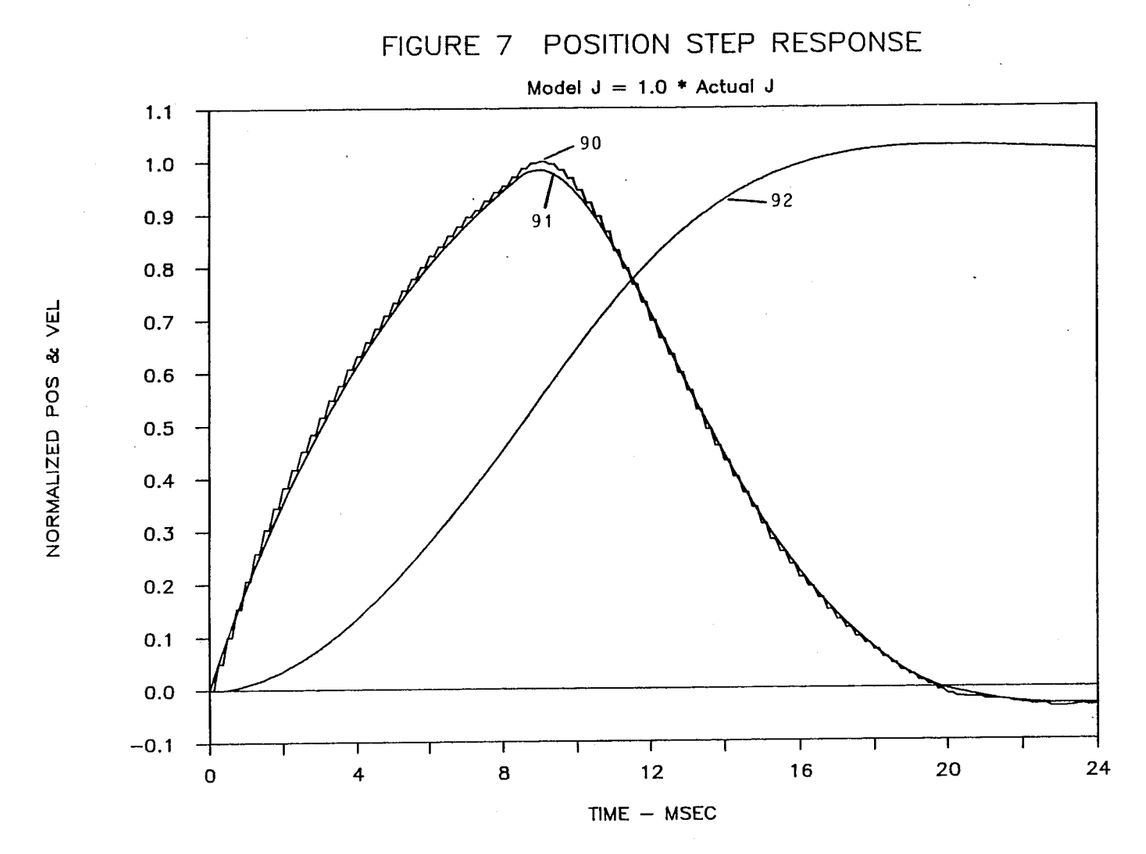
FIG. 7 shows graphs describing the performance of the circuit of the present invention, when the value for the moment of inertia of the motor, in the mathematical model of the motor, is equal to the true value.

FIG. 7 gives the same information as FIG. 6, for the case where the value of J in the model is the true value. As expected, in this case, the estimated and actual velocities virtually coincide.

In most applications, the performance of the velocity estimation circuit of the present invention is relatively independent of the values of $\omega_o$ and $\phi$. As stated above, if $\omega_o$ is greater than bandwidth of the control loop, the circuit will respond quickly to changes in the control current. The parameter $\phi$ can be permanently set to 0.7, because it is a dimensionless constant, and is an inherent parameter of simple harmonic motion.

However, there are cases when the value of $\omega_o$, as used in the circuit, would change. For example, if one is using a new motor, without any knowledge of its parameters, one would have no idea of the bandwidth of the control loop, and thus the proper value of $\omega_o$ would not be known beforehand. Also, any system can change with time; the motor load model, for example, could change sufficiently to require an adjustment in the value of $\omega_o$. In these cases, it would be necessary to determine $\omega_o$ more accurately. This determination can be part of the "Level 2" parameter adjustment circuit 28.

One method of adjusting $\omega_o$ is to observe the random fluctuations in the motor-command current, and to adjust $\omega_o$ for a given level of current fluctuation. In general, as $\omega_o$ increases, the circuit becomes more responsive to noise. On the other hand, as indicated above, it is desirable to make $\omega_o$ large, to insure that it exceeds the bandwidth of the control loop. Therefore, $\omega_o$ could be gradually increased, until the rms fluctuations of the motor current reach a predetermined percentage of their original value. Thus, $\omega_o$ would be made as large as possible, within the limits at which noise could be tolerated.

Another method of adjusting $\omega_o$ is to require that the ratio of $\omega_o$ to the control loop bandwidth be a certain value.

Also, the above methods can be combined, to adjust $\omega_o$ for a given level of current fluctuation, subject to a minimum value based on the ratio of $\omega_o$ to the control loop bandwidth.

The "Level 2" adjustment circuit 28 can also adjust the motor-load parameter $K_T/J$. One way of doing so is to time the initial linear or rotational motion of the object, and to compare this motion with the amount of applied current. The following discussion gives an example of this procedure.

The system is assumed to be initially at rest, and a current of $I_o$ amperes is applied to the motor for a period of T seconds. The torque generated (i.e. $I_oK_T$) is assumed to be relatively large compared to friction torques, so that a substantial portion of this torque accelerates the load. The total angular displacement $\theta_M$, in radians, during period T, is then approximately related to $K_T/J$ as follows:

$$K_T/J = (2\theta_M)/(I_o T^2)$$

The latter relationship is obtained by simply integrating the basic equation $K_T I = J\ddot\theta$. Thus, the parameter $K_T/J$ can be determined, to satisfactory accuracy, by the simple test described above, which can be performed automatically as often as necessary. Such a simple test is adequate because, as discussed above, only a rough estimate of $K_T/J$ is required to achieve an accurate velocity estimate.

The calculations discussed above can be done under the control of a microprocessor, or equivalent device. The microprocessor can store the values obtained, in non-volatile memory, so that they can be used again. The microprocessor could also be programmed to "tune" the ratio $K_T/J$ continuously, but this degree of accuracy is not necessary in practice.

The above-described procedure can be used every time the system is turned on, so that the system can correct itself after a few seconds of operation. The procedure can also be invoked just before the main operation is to begin, as a preliminary calibration routine.

It should be emphasized again that, in most cases, the "Level 2" adjustments are not necessary. It is an important feature of the invention that, in most applications, the motor can be very accurately controlled with the simple model given in Level 1. If the initial choices of $K_T$ and J (or $K_F$ and M) are reasonable, they can be kept constant, and the system will provide accurate motor control.

As mentioned above, another possible refinement of the model, which can be included in the "Level 2" circuit 28 is a provision for more accurate representation of the torque in the system. Specifically, the motor torque can be assumed to be divisible into the "spring" torque and the "friction" torque. That is, the spring torque, in the rotational case, is defined as $K_s\theta$, and the friction torque is defined as $K_f\dot\theta$. These terms can be separately subtracted from the product of the current and the torque constant $K_T$ to produce a better estimate of the net torque providing acceleration. This estimate can then be divided by J, the moment of inertia, and the resulting signal can be integrated as before. In the case of linear motion, one would substitute the spring force and the damping force due to friction, instead of the spring and friction torques described above.

The circuit of the present invention is comparatively free of electrical "noise". The velocity estimation circuit works by integrating, not differentiating, so the signals produced are relatively smooth.

The invention can be implemented by either analog or digital means. Thus, for example, integrators 30 and 32, in FIG. 3, can be amplifiers configured to integrate, or they can be finite-increment algorithms programmed on a digital computer. In the latter case, the motor current would need to be sampled repeatedly, at discrete intervals, and converted into a digital signal, before being fed into the velocity estimation circuit. The encoder would also need to supply a digitized indication of shaft position to the estimation circuit. All of the other circuit elements could easily be represented digitally, in a computer program. The digital output of the velocity estimation circuit would then be converted into analog form, for use in controlling the motor.

Also, the "Level 2" adaptive parameter adjustments can also be implemented either by analog or digital means.

The invention has been described with respect to a command current applied to a servo amplifier which provides a corresponding current to a motor or actuator. The invention could also be used with a voltage-driven motor or actuator. One could either calculate the current in the motor, or could measure the current directly. The operation of the invention would be otherwise the same. This latter alternative is considered within the scope of the invention.

While the invention has been described with respect to specific embodiments, it is understood that the invention can be modified in many ways, within the scope of the above disclosure. The type of motor can be varied. The invention is not limited to either linear or rotational motion. The specific design of the comparators, summers, and integrators used in the velocity estimating circuit can be varied. There are also many variations possible in the circuit of block 28, and only some of the possibilities have been discussed. These and other similar modifications are to be considered within the spirit and scope of the following claims.

What is claimed is:

1. In an apparatus for control of the motion of an object, the object being moved by an electric motor, the apparatus including means for sensing the position of the object, the motor being controlled by a control current which is dependent, at least in part, on a velocity feedback signal, the improvement comprising means for sampling the control current, means for measuring the actual position of the object, means for multiplying the control current by a motor model constant, the output of the multiplying means being connected to the input of a first integrating means, the output of the first integrating means being connected to the input of a second integrating means, the output of the second integrating means being connected to a means for comparing the output of the second integrating means with the output of the measuring means, means for multiplying the output of the comparing means by a first constant, and for adding the resulting product signal to the input of the second integrating means, the output of the latter multiplying means being permanently connected to the input of the second integrating means, means for multiplying the output of the comparing means by a second constant, and for adding the resulting product signal to the input of the first integrating means, wherein the output of the first integrating means comprises the input signal which is the estimated velocity of the object.

2. The improvement of claim 1, wherein the motor generates rotational motion, and wherein the motor model constant is the torque constant of the motor divided by the moment of inertia of the motor.

3. The improvement of claim 1, wherein the motor generates linear motion, and wherein the motor model constant is the force constant of the motor divided by the mass of the motor.

4. The improvement of claim 1, wherein the first constant is proportional to the product of a frequency constant and a damping factor.

5. The improvement of claim 4, wherein the second constant is the square of the frequency constant.

6. In an apparatus for control of the motion of an object, the object being moved by an electric motor, the apparatus including means for sensing the position of the object, the motor being controlled by a control current which is dependent, at least in part, on a velocity feedback signal, the improvement comprising means for sampling the control current, means for measuring the actual position of the object, means for multiplying the control current by a motor model constant, the output of the multiplying means being connected to the input of a first integrating means, the output of the first integrating means being connected to the input of a second integrating means, the output of the second integrating means being connected to a means for comparing the output of the second integrating means with the output of the measuring means, means for multiplying the output of the comparing means by a first constant, and for adding the resulting signal to the input of the second integrating means, the output of the latter multiplying means being permanently connected to the input of the second integrating means, means for multiplying the output of the comparing means by a second constant, and for adding the resulting signal to the input of the first integrating means, wherein the input to the second integrating means comprises the signal which is the estimated velocity of the object.

7. The improvement of claim 6, wherein the motor generates rotational motion, and wherein the motor model constant is the torque constant of the motor divided by the moment of inertia of the motor.

8. The improvement of claim 6, wherein the motor generates linear motion, and wherein the motor model constant is the force constant of the motor divided by the mass of the motor.

9. The improvement of claim 6, wherein the first constant is proportional to the product of a frequency constant and a damping factor.

10. The improvement of claim 9, wherein the second constant is the square of the frequency constant.

11. In an apparatus for control of the motion of an object, the object being moved by an electric motor, the apparatus including means for sensing the position of the object, the object being controlled by a control current which is dependent, at least in part, on a velocity feedback signal, the improvement comprising a velocity estimator circuit, the circuit comprising first and second integrators, the input to the first integrator being dependent, at least in part, on the control current, and on the difference between the actual position and the position indicated by the output of the second integrator, the input to the second integrator being dependent, at least in part, on the output of the first integrator, the input to the second integrator being permanently connected to means for measuring the difference between the actual position and the position indicated by the output of the second integrator, wherein the estimator circuit includes means for multiplying the control current by at least one value which is characteristic of the motor, said value being a constant, and wherein the output of the first integrator comprises the estimated velocity.

12. The improvement of claim 11, further comprising means for determining the value characteristic of the motor, said determining means including means for displacing the object, from rest, with a given current applied to the motor, and means for measuring the time elapsed and displacement of the object.

13. In an apparatus for control of the motion of an object, the object being moved by an electric motor, the apparatus including means for sensing the position of the object, the object being controlled by a control current which is dependent, at least in part, on a velocity feedback signal, the improvement comprising a velocity estimator circuit, the circuit comprising first and second integrators, the input to the first integrator being dependent, at least in part, on the control current, and on the difference between the actual position and the output of the second integrator, the input to the second integrator being dependent, at least in part, on the output of the first integrator, the input to the second integrator being permanently connected to means for measuring the difference between the actual position and the output of the second integrator, wherein the estimator circuit includes means for multiplying the control current by at least one value which is characteristic of the motor, said value being a constant, and wherein the signal at the input to the second integrator comprises the estimated velocity.

14. The improvement of claim 13, further comprising means for determining the value characteristic of the motor, said determining means including means for displacing the object, from rest, with a given current applied to the motor, and means for measuring the time elapsed and displacement of the object.

15. A method of controlling the motion of an object, the object being moved by a motor which is powered by a current-driven amplifier, comprising the steps of:
   (a) sampling the current output of the amplifier and the position of the object,
   (b) multiplying the current signal by at least one constant relating to the structure of the motor,
   (c) integrating the resulting signal twice in succession, each integrating step including the step of adding, to the input to the integrator, a signal proportional to the difference between the output of the second integrating step and the actual position of the object, the adding step being performed without interruption, and
   (d) connecting the output of the first integrating step to the amplifier.

16. The method of claim 15, wherein the constant in step (b) is determined by $(2s_M)/(I_oT^2)$, where $s_M$ is the total displacement of the object during period T, when the object is accelerated from rest due to current $I_o$ applied to the motor.

17. A method of controlling the motion of an object, the object being moved by a motor which is powered by a current-driven amplifier, comprising the steps of:

(a) sampling the current output of the amplifier and the position of the object,
(b) multiplying the current signal by at least one constant relating to the structure of the motor,
(c) integrating the resulting signal twice in succession, each integrating step including the step of adding, to the input to the integrator, a signal proportional to the difference between the output of the second integrating step and the actual position of the object, the adding step being performed without interruption, and
(d) connecting the sum of the output of the first integrating step, and the difference signal, to the amplifier.

18. The method of claim 17, wherein the constant in step (b) is determined by $(2s_M)/(I_oT^2)$, where $s_M$ is the total displacement of the object during period T, when the object is accelerated from rest due to current $I_o$ applied to the motor.

19. In an apparatus for control of the motion of an object, the object being moved by an electric motor, the apparatus including means for sensing the position of the object, the motor being controlled by a control current which is dependent, at least in part, on a velocity feedback signal, the improvement comprising means for sampling the control current, means for measuring the actual position of the object, means for multiplying the control current by a motor model constant, the output of the multiplying means being connected to the input of a first integrating means, the output of the first integrating means being connected to the input of a second integrating means, the output of the second integrating means being connected to a means for comparing the output of the second integrating means with the output of the measuring means, means for multiplying the output of the comparing means by a first constant, and for adding the resulting product signal to the input of the second integrating means, means for multiplying the output of the comparing means by a second constant, and for adding the resulting product signal to the input of the first integrating means, wherein the output of the first integrating means comprises the input signal which is the estimated velocity of the object, wherein the first constant is proportional to the product of a frequency constant and a damping factor.

20. The improvement of claim 19, wherein the second constant is the square of the frequency constant.

21. In an apparatus for control of the motion of an object, the object being moved by an electric motor, the apparatus including means for sensing the position of the object, the motor being controlled by a control current which is dependent, at least in part, on a velocity feedback signal, the improvement comprising means for sampling the control current, means for measuring the actual position of the object, means for multiplying the control current by a motor model constant, the output of the multiplying means being connected to the input of a first integrating means, the output of the first integrating means being connected to the input of a second integrating means, the output of the second integrating means being connected to a means for comparing the output of the second integrating means with the output of the measuring means, means for multiplying the output of the comparing means by a first constant, and for adding the resulting signal to the input of the second integrating means, means for multiplying the output of the comparing means by a second constant, and for adding the resulting signal to the input of the first integrating means, wherein the input to the second integrating means comprises the signal which is the estimated velocity of the object, wherein the first constant is proportional to the product of a frequency constant and a damping factor.

22. The improvement of claim 21, wherein the second constant is the square of the frequency constant.

23. In an apparatus for control of the motion of an object, the object being moved by an electric motor, the apparatus including means for sensing the position of the object, the object being controlled by a control current which is dependent, at least in part, on a velocity feedback signal, the improvement comprising a velocity estimator circuit, the circuit comprising first and second integrators, the input to the first integrator being dependent, at least in part, on the control current, and on the difference between the actual position and the position indicated by the output of the second integrator, the input to the second integrator being dependent, at least in part, on the output of the first integrator and on the difference between the actual position and the position indicated by the output of the second integrator, wherein the estimator circuit includes means for multiplying the control current by at least one value which is characteristic of the motor, said value being a constant, and wherein the output of the first integrator comprises the estimated velocity, further comprising means for determining the value characteristic of the motor, said determining means including means for displacing the object, from rest, with a given current applied to the motor, and means for measuring the time elapsed and displacement of the object.

24. In an apparatus for control of the motion of an object, the object being moved by an electric motor, the apparatus including means for sensing the position of the object, the object being controlled by a control current which is dependent, at least in part, on a velocity feedback signal, the improvement comprising a velocity estimator circuit, the circuit comprising first and second integrators, the input to the first integrator being dependent, at least in part, on the control current, and on the difference between the actual position and the output of the second integrator, the input to the second integrator being dependent, at least in part, on the output of the first integrator and on the difference between the actual position and the output of the second integrator, wherein the estimator circuit includes means for multiplying the control current by at least one value which is characteristic of the motor, said value being a constant, and wherein the signal at the input to the second integrator comprises the estimated velocity, further comprising means for determining the value characteristic of the motor, said determining means including means for displacing the object, from rest, with a given current applied to the motor, and means for measuring the time elapsed and displacement of the object.

25. A method of controlling the motion of an object, the object being moved by a motor which is powered by a current-driven amplifier, comprising the steps of:
(a) sampling the current output of the amplifier and the position of the object,
(b) multiplying the current signal by at least one constant relating to the structure of the motor,
(c) integrating the resulting signal twice in succession, each integrating step including the step of adding, to the input to the integrator, a signal proportional to the difference between the output of the second integrating step and the actual position of the object, and (d) connecting the output of the first integrating step to the amplifier, wherein the constant in step (b) is determined by $(2s_M)/(I_oT^2)$, where $s_M$ is the total displacement of the object during period T, when the object is accelerated from rest due to current $I_o$ applied to the motor.

26. A method of controlling the motion of an object, the object being moved by a motor which is powered by a current-driven amplifier, comprising the steps of:

(a) sampling the current output of the amplifier and the position of the object, (b) multiplying the current signal by at least one constant relating to the structure of the motor, (c) integrating the resulting signal twice in succession, each integrating step including the step of adding, to the input to the integrator, a signal proportional to the difference between the output of the second integrating step and the actual position of the object, and (d) connecting the sum of the output of the first integrating step, and the difference signal, to the amplifier, wherein the constant in step (b) is determined by $(2s_M)/(I_oT^2)$, where $s_M$ is the total displacement of the object during period T, when the object is accelerated from rest due to current $I_o$ applied to the motor.

27. In an apparatus for controlling the motion of an object, the object being moved by a motor powered by a current-driven amplifier, the improvement comprising a damped simple harmonic oscillator circuit, at least one input of the circuit being proportional to the current in said amplifier, multiplied by a constant relating the acceleration of the motor to the current applied the output of the circuit being an estimate of the velocity of the object, wherein the bandwidth of the simple harmonic oscillator circuit exceeds the bandwidth of the amplifier, and including means for determining said constant, said determining means including means for displacing the object, from rest, with a given current applied to the motor, and means for measuring the time elapsed and displacement of the object.

28. In an apparatus for controlling the motion of an object, the object being moved by a motor powered by a current-driven amplifier, the improvement comprising a damped simple harmonic oscillator circuit, at least one input of the circuit being proportional to the current in said amplifier, multiplied by a constant relating the acceleration of the motor to the current applied the output of the circuit being an estimate of the velocity of the object, wherein the bandwidth of the simple harmonic oscillator circuit exceeds the bandwidth of the amplifier, wherein the simple harmonic oscillator circuit comprises two integrators, and wherein the output signal is a linear combination of the output signal of the first integrator and the input signal to the second integrator.

29. In an apparatus for controlling the motion of an object, the object being moved by a motor powered by a current-driven amplifier, the improvement comprising a damped simple harmonic oscillator circuit, at least one input of the circuit being proportional to the current in said amplifier, multiplied by a constant relating the acceleration of the motor to the current applied the output of the circuit being an estimate of the velocity of the object, wherein the bandwidth of the simple harmonic oscillator circuit exceeds the bandwidth of the amplifier, wherein the motion of the object is rotational, and wherein said constant is the torque constant of the motor divided by the moment of inertia of the motor.

30. In an apparatus for controlling the motion of an object, the object being moved by a motor powered by a current-driven amplifier, the improvement comprising a damped simple harmonic oscillator circuit, at least one input of the circuit being proportional to the current in said amplifier, multiplied by a constant relating the acceleration of the motor to the current applied the output of the circuit being an estimate of the velocity of the object, wherein the bandwidth of the simple harmonic oscillator circuit exceeds the bandwidth of the amplifier, wherein the motion of the object is linear, and wherein said constant is the force constant of the motor divided by the mass of the motor.

* * * * *